(12) United States Patent
Lin et al.

(10) Patent No.: US 8,928,853 B2
(45) Date of Patent: Jan. 6, 2015

(54) METHOD AND SYSTEM FOR REPAIRING FLAT PANEL DISPLAY

(75) Inventors: Cen-Ying Lin, Kaohsiung (TW); Wei-Chih Shen, Tainan (TW); Chung-Wei Cheng, Miaoli County (TW); Chih-Wei Chien, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 958 days.

(21) Appl. No.: 13/031,976

(22) Filed: Feb. 22, 2011

(65) Prior Publication Data

US 2012/0002155 A1 Jan. 5, 2012

(51) Int. Cl.
G02F 1/13 (2006.01)
G02F 1/35 (2006.01)
G02F 1/1362 (2006.01)
G02F 1/1335 (2006.01)

(52) U.S. Cl.
CPC ........ G02F 1/136259 (2013.01); *G02F 1/3523* (2013.01); *G02F 2001/136268* (2013.01); *G02F 2201/508* (2013.01); *G02F 1/133512* (2013.01)
USPC ...................................................... 349/192

(58) Field of Classification Search
CPC .............................................. G02F 1/136259
USPC ............................................................ 349/192
See application file for complete search history.

(56) References Cited

U.S. PATENT DOCUMENTS

| | | | |
|---|---|---|---|
| 5,926,246 A | 7/1999 | Tomita et al. | |
| 6,812,992 B2 | 11/2004 | Nemeth | |
| 7,502,094 B2 | 3/2009 | Son | |
| 7,636,148 B2 | 12/2009 | Yoo et al. | |
| 2005/0032285 A1* | 2/2005 | Imahara et al. | 438/166 |
| 2006/0050623 A1 | 3/2006 | Hartman | |
| 2010/0134717 A1* | 6/2010 | Ikeda et al. | 349/62 |

FOREIGN PATENT DOCUMENTS

| | | |
|---|---|---|
| CN | 1790103 A | 6/2006 |
| CN | 101221299 A | 7/2008 |
| CN | 101707897 A | 5/2010 |
| JP | 2007241274 A | 9/2007 |
| TW | 200807062 A | 2/2008 |
| TW | 200827819 | 7/2008 |
| TW | 200827821 | 7/2008 |
| TW | 200829977 | 7/2008 |

(Continued)

OTHER PUBLICATIONS

Taiwan Patent Office, Office Action, Patent Application Serial No. TW099121857, Oct. 21, 2013, Taiwan.

(Continued)

*Primary Examiner* — Eric Wong
(74) *Attorney, Agent, or Firm* — Rabin & Berdo, P.C.

(57) ABSTRACT

The present invention provides a method and system for repairing flat panel display, which repairing hot pixels of the flat panel display by femtosecond laser. The flat panel display comprises a LCD module and a color filter disposed on the top of the LCD module, wherein the surface of the color filter corresponding to the LCD module further has a color photoresist layer. The femtosecond laser is projected onto the color photoresist layer corresponding to the hot pixels such that a phenomenon of nonlinear multiple photons absorption can be occurred to change property of the color photoresist layer so as to transform the hot pixels into dead pixels.

15 Claims, 6 Drawing Sheets

(56) References Cited

FOREIGN PATENT DOCUMENTS

| TW | 200829977 A | 7/2008 |
|---|---|---|
| TW | 200912440 | 3/2009 |
| TW | 200912440 A | 3/2009 |
| TW | 200916886 | 4/2009 |
| TW | 200916886 A | 4/2009 |
| WO | WO-2008-156286 A1 | 12/2008 |

OTHER PUBLICATIONS

Schaffer et al., "Laser-induced breakdown and damage in bulk transparent materials induced by tightly-focused femtosecond laser pulses", Measurement Science and Technology, vol. 12, No. 11, pp. 1-42, 2001.

Chris B. Schaffer et al., "Micromachining bulk glass by use of femtosecond laser pulses with nanojoule energy", Optics Letters, Jan. 15, 2001, vol. 26, No. 2, pp. 93-95.

Chung-Wei Cheng et al.,"Micro patterning of Crystalline Structures on a—ITO Films on Plastic Substrates Using Femtosecond Laser", JLMN-Journal of Laser Micro/Nanoengineering, vol. 4, No. 3, 2009, pp. 234-238.

Chung-Wei Cheng et al., "Femtosecond Laser-induced Crystallization of Amorphous Indium Tin Oxide Film on Glass Substrate for pattering Applications", JLMN-Journal of Laser Micro/ Nanoengineering vol. 4, No. 3, 2009, pp. 165-169.

* cited by examiner

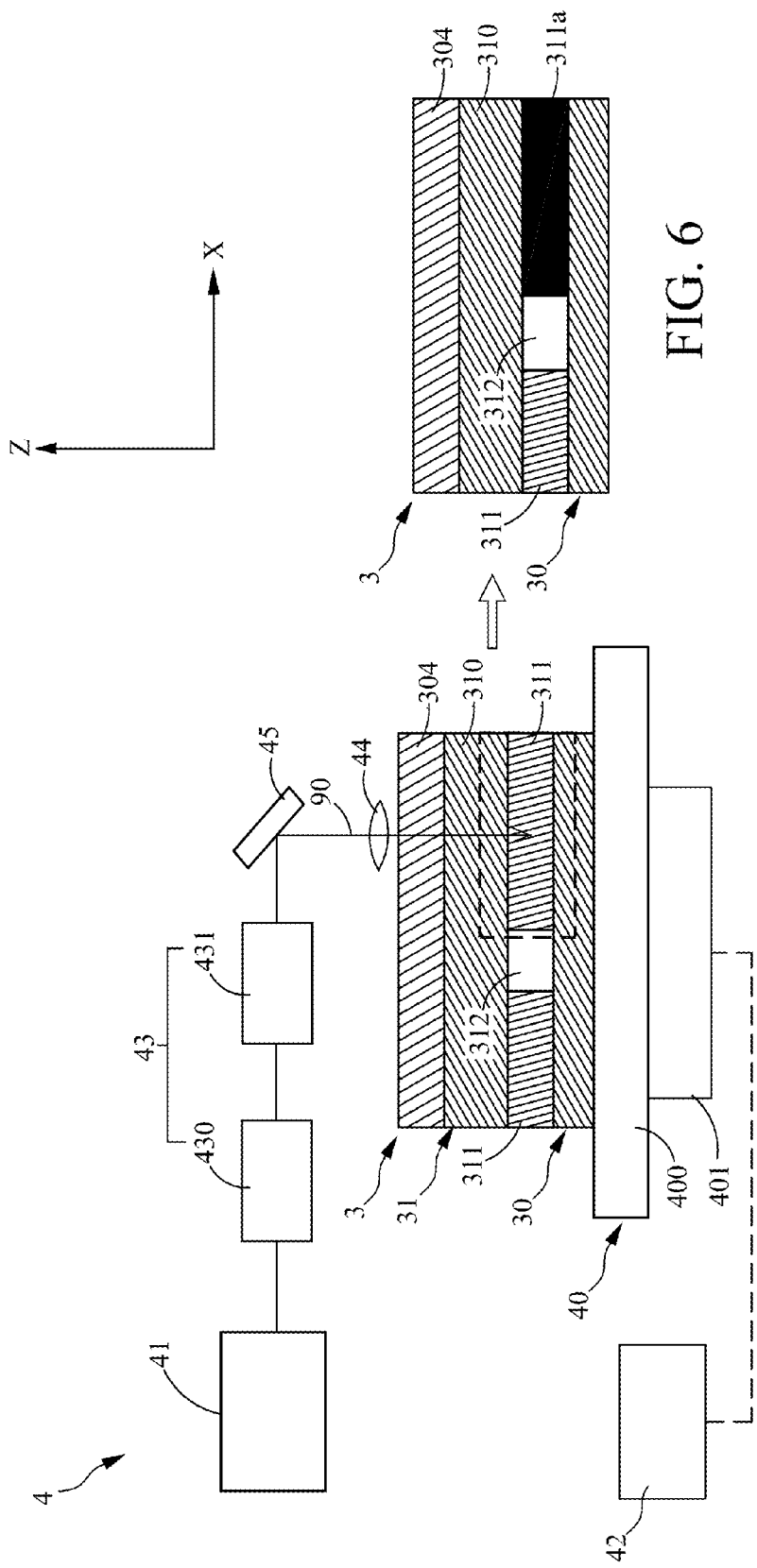

METHOD AND SYSTEM FOR REPAIRING FLAT PANEL DISPLAY

FIELD

The present disclosure relates to a repair technique, and more particularly, to a method and system for repairing flat panel display.

BACKGROUND

A liquid crystal display (LCD, being an non-active light emitting device, usually is designed to operate in conjunction with a backlight module for achieving a stable brightness and good color performance, whereas pixels in an image of various grey levels or brightness values can be achieved through the control of the driving circuits and the liquid crystal layer in the LCD, and the color presentation of each pixel can be achieved through the red-photoresist coating, green-photoresist coating and blue-photoresist coating in its color filter. However, if the panel of a display device is defected, there can be abnormality to the color presentation happening in some pixels of the display device, i.e. there can be hot pixels or dark pixels existed in the panel. Among which, since the hot pixels clearly stand out above the rest, the amount of hot pixels existed can treated as an essential element for ranking display panels.

There are already many studies focusing on technique for repairing LCD. One of which is a method for repairing LCD panel, disclosed in TW Pat. Pub. No. 200827819, in which, first, a beam of nanosecond laser is projected on the filter of a LCD panel for producing gaps on the filter, and then a beam of femtosecond laser or diode laser is projected on the filter while enabling the same to be linearly absorbed by the filter with gaps, and thus altering the physical characteristic of the filter so as to reduce the transmittance relating to the hot pixels of the LCD panels. It is noted that in the aforesaid study, a single photo linear absorption is observed on the filter under the projection of the femtosecond laser. Another such study is a method and apparatus for repairing LCD panel, disclosed in TW Pat. Pub. No. 200829977, in which according to the linear absorption characteristic of the LCD panel, the repair can be performed using a continuous-wave (CW) laser with a wavelength ranged between 400 nm to 490 nm, a pulse laser, or a femtosecond laser with a wavelength of 450 nm and a frequency higher than 10 MHz. However, the aforesaid laser projection should be performed through the transistor side of the LCD since the laser projection can easily cause damage to the polarizer in the LCD if it is projected from the color filter side. Nevertheless, since the transmittances of the laser whose wavelength is ranged between 400 nm to 490 nm are low with respect to the red-photoresist coating and green-photoresist coating as well, the hot pixels of the LCD panel will be subjected to band processed by beams of suitable energy.

Moreover, in WO 2008-156286, a repairing method capable of effectively repairing a bright pixel defect of a display device using laser is disclosed, in which as the display device is configured with black matrices, the method includes forming a gap at a color filter having a bright pixel defect between the color filter and a glass using laser, and decomposing black matrices neighboring to the color filter using laser for diffusing the gaps with the melt black matrices so as to blacken the photoresist of the deflective pixels. In addition, in another repairing method disclosed in U.S. Pat. No. 7,502,094, the surface of the color filter in a LCD panel that is facing toward its substrate is blackened by projecting a Nd:YAG laser of 380~740 in wavelength and of a frequency higher than 55 Hz upon the surface. As there can be diffusion during the laser projection, three optical masks of different sizes are used for minimizing the diffusion effect so as to enhance the not pixel repairing efficiency.

In an apparatus and method for repairing liquid crystal display device disclosed in U.S. Pat. No. 7,636,148, there are three different repairing methods being provided. The three repairing methods all includes the steps of: forming a repairing film on any one of a first substrate and a second substrate; sensing a defect area in the liquid crystal display panel; and irradiating a laser, such as an excimer laser, a diode laser or a Nd:YAG laser, to an area of the repairing film corresponding to the defect area, but the different is that: the repairing film in the first method is a transparent organic film, the repairing film in the second method is a black matrix; and the repairing film in the third method is a pattern spacer. Moreover, in a method for the correction of a defect in a liquid crystal display device disclosed in U.S. Pat. No. 5,926,246, an aligning film in a defective pixel is irradiated with a laser to form minute grooves in a different direction than the rubbing direction of the aligning film, whereby the orientation of the liquid crystal is changed so that the liquid crystal between the aligning films is no longer twisted. Thereby, a defective pixel present in a liquid crystal display panel can be made inconspicuous, and as a result, degradation of the display quality of the liquid crystal display device after correction can be prevented. It is noted that for preventing other areas in the LCD device from being damaged by the laser projection, the wavelength of the laser is ranged between 200 nm to 450 nm. In the aforesaid patent, by the projection of the laser upon the aligning film, the liquid crystal molecules in the liquid crystal layer of the defective pixel are oriented randomly at the irradiation spots. Therefore, the spots irradiated by laser beams on the defective pixel allow light of an intermediate tone to transmit therethrough, whereas the amount of transmitted light can be regulated in the areas surrounding the laser beam irradiated spots. Accordingly, the defective pixel present in the liquid crystal display panel, as a whole, can be made inconspicuous, and as a result, a decline in the display quality of the liquid crystal display device after correction can be prevented.

SUMMARY

The present disclosure relates to a method and system for repairing flat panel display, in that a material modification process is performed using a femtosecond laser, and also by the use of the femtosecond laser, a phenomenon of nonlinear multiple photons absorption can be induced with very localized heat affected area and controllable processing depth, any defective pixel inside the panel of a packaged flat panel display can be repaired thereby directly.

The present disclosure also relates to a method and system for repairing a packaged TFT-LCD panel, in that a femtosecond laser beam is projected passing through a filter having a polarizer and focused upon the color photoresist at positions corresponding to the defective hot pixels for modifying and blackening the color photoresist and thus eliminating the hot pixels by transforming the hot pixels into dark pixels without causing any damages to other areas, and thereby, improving the product quality and ranking of the flat panel display. Moreover, as the laser projection will not cause any damage to other areas or components, such as the polarizer, it is no need to detach the polarizer from the filter before proceeding with the laser projection, and thus, the time required for repairing the flat panel display is reduced.

In an embodiment, the present disclosure provides a method for repairing flat panel display, which comprises the steps of: providing a flat panel display having at least one not pixel and being configured with a liquid crystal module and a filter in a manner that the filter is formed with a photoresist layer while being disposed on the liquid crystal module; and projecting a femtosecond laser beam on the photoresist layer at positions corresponding to the at least one hot pixel for blackening the corresponding hot pixels due to nonlinear multiple photon absorption.

In another embodiment, the present disclosure provides a system for repairing flat panel display, which comprises: a mobile platform; a flat panel display, having at least one not pixel formed thereat while being disposed on the mobile platform, and being configured with a liquid crystal module and a filter having a photoresist layer formed thereon; and a femtosecond laser source, for providing and projecting a femtosecond laser beam on the photoresist layer at positions corresponding to the at least one hot pixel for blackening the corresponding hot pixels due to nonlinear multiple photon absorption.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 5 is a schematic diagram showing a system for repairing flat panel display according to the present disclosure.

FIG. 6 is a schematic diagram showing a blackened photoresist layer according to the present disclosure.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
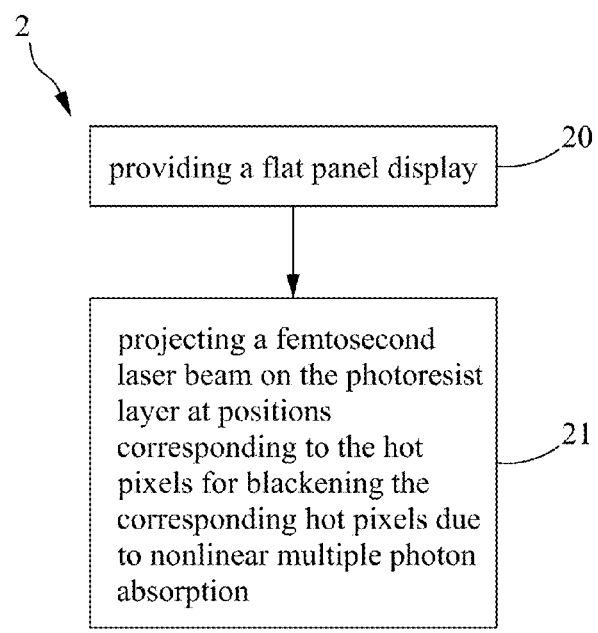
FIG. 1 is a flow chart depicting the steps in a method for repairing flat panel display according to the present disclosure.
Figure 2:
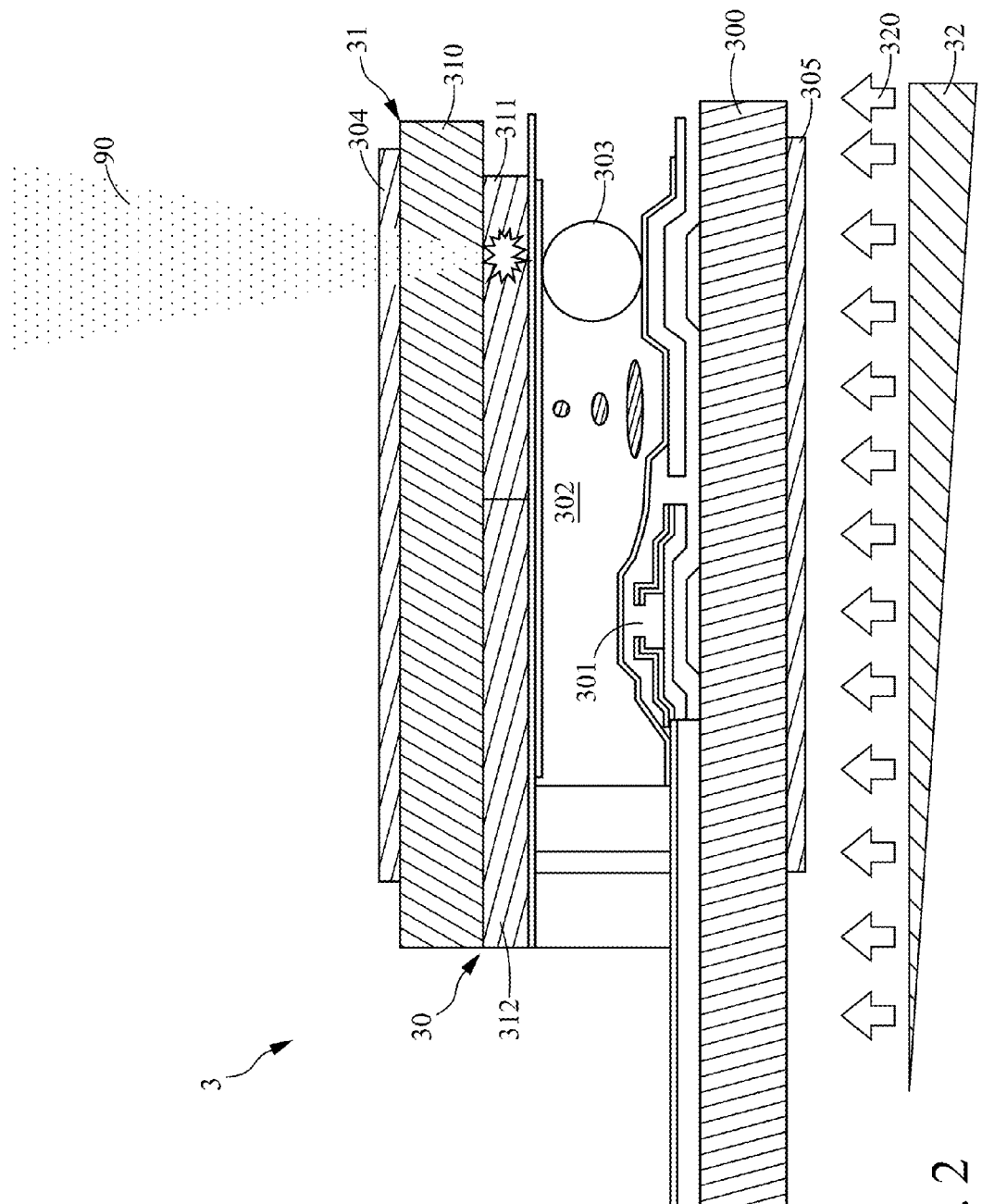
FIG. 2 is a cross sectional view of a flat panel display
Figure 3:
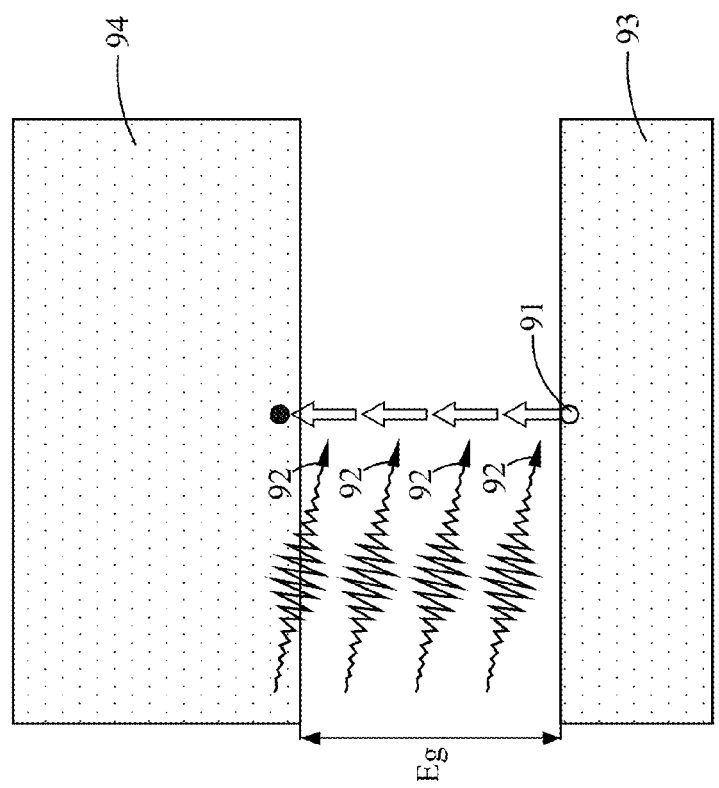
FIG. 3 is a schematic diagram showing a phenomenon of nonlinear multiple photons absorption.

Please refer to FIG. 1, which is a flow chart depicting the steps in a method for repairing flat panel display according to the present disclosure. The repairing method 2 starts from the step 20. At step 20, a flat panel display 3 is provided, which is composed of: a liquid crystal module 30, a filter 31, a backlight module 32, as shown in FIG. 2; and then the flow proceeds to step 21. As shown in FIG. 2, the liquid crystal module 30 is configured with a substrate 300, which is provided for a thin film transistor (TFT) layer 301 to be disposed thereon and can be made of a transparent material such as glass or plastic. Moreover, the liquid crystal module 30 further has a liquid crystal layer 302 formed on the TFT layer 301, whereas liquid crystal layer 302 has a spacer 303 embedded therein. In addition, the substrate 310 is coated with a photoresist layer 311 at positions corresponding to the liquid crystal layer 302. In this embodiment, the filter 31 is a color filter, and the photoresist layer 311 is a color photoresist layer. Nevertheless, the filter 31 can be a monochrome filter and also the photoresist layer 311 is a monochrome photoresist layer. However, in this embodiment, the photoresist layer is composed of a red-photoresist coating (R), a green-photoresist coating (G) and a blue-photoresist coating (B). For illustration the color photoresist 311 in FIG. 2 is a green-photoresist coating (G), whereas there is a black matrix being disposed next to a side of the green-photoresist coating (G). The backlight module 32 is used for projecting beams toward the liquid crystal module 30. It is noted that there are deflective pixels existed on the flat panel display 3, and in this embodiment, the deflective pixels are hot pixels that can caused by the defects happening in the photoresist layer 311, the liquid crystal layer 30 or even defective circuits for enabling the corresponding pixels to remain constantly on, rather than cycling on and off like other pixels do. As shown in FIG. 2, there are two polarizers 304, 305 that are disposed respectively on a top surface of the filter 31 and on a bottom surface of the substrate 300. It is noted that the present disclosure is not limited to be applied in the aforesaid liquid crystal module and backlight module, as it is used only for illustration, and thus, the present disclosure can be adapted for a color electronic paper with electronic ink module. Accordingly, the repairing method disclosed in the present disclosure is not limited only to fix hot pixels in crystal liquid displays, but it can be adapted for any display having filters embedded therein.

After the step 20 is completed, the flow proceeds to step 21. At step 21, a femtosecond laser beam is projected on the photoresist layer 311 at positions corresponding to the hot pixels for blackening the corresponding hot pixels due to nonlinear multiple photon absorption. It is noted that as soon as the positions on the photoresist layer 311, no matter it is on the red-photoresist coating (R), the green-photoresist coating (G) or the blue-photoresist coating (B), that are corresponding to the hot pixels, are modified by the laser beam and thus blackened, the hot pixels will be transformed into dark pixels since the light of the constant-on hot pixels will be blocked by the blackened photoresist layer 311. Moreover, by the nonlinear multiple photon absorption characteristic of the femtosecond laser, other areas or components, such as the polarizer 304, will not be damaged by the laser projection, and thus the product quality and ranking are enhanced as the deflective hot pixels can be made inconspicuous after repairing. It is noted that there is a polarizer 304 embedded inside the flat panel display 3 during the whole repairing process in this embodiment, but it can be removed from the flat panel display 3 for projecting the femtosecond laser beam directly onto the photoresist layer 311 at positions corresponding to the hot pixels. Hereinafter, the principle of the repairing method is described. As shown in FIG. 2, under the projection of a femtosecond laser beam for subjecting a focus area by a high laser pulse power density that can be higher than $10^{12}$ W/cm², an electron 91 in one atom of the color photoresist can be energized after absorbing energies of multiple photons 92 due to nonlinear multiple photons absorption, and thus transit from the valence band 93 to the conduction band 94. That is, even when the photoresist is projected by a femtosecond laser beam whose wavelength is ranged in a specific range for enabling the same to travel passing the photoresist with high transmittance, the photoresist can still be modified thereby due to the nonlinear multiple photons absorption characteristic of the femtosecond laser.

Figure 4:
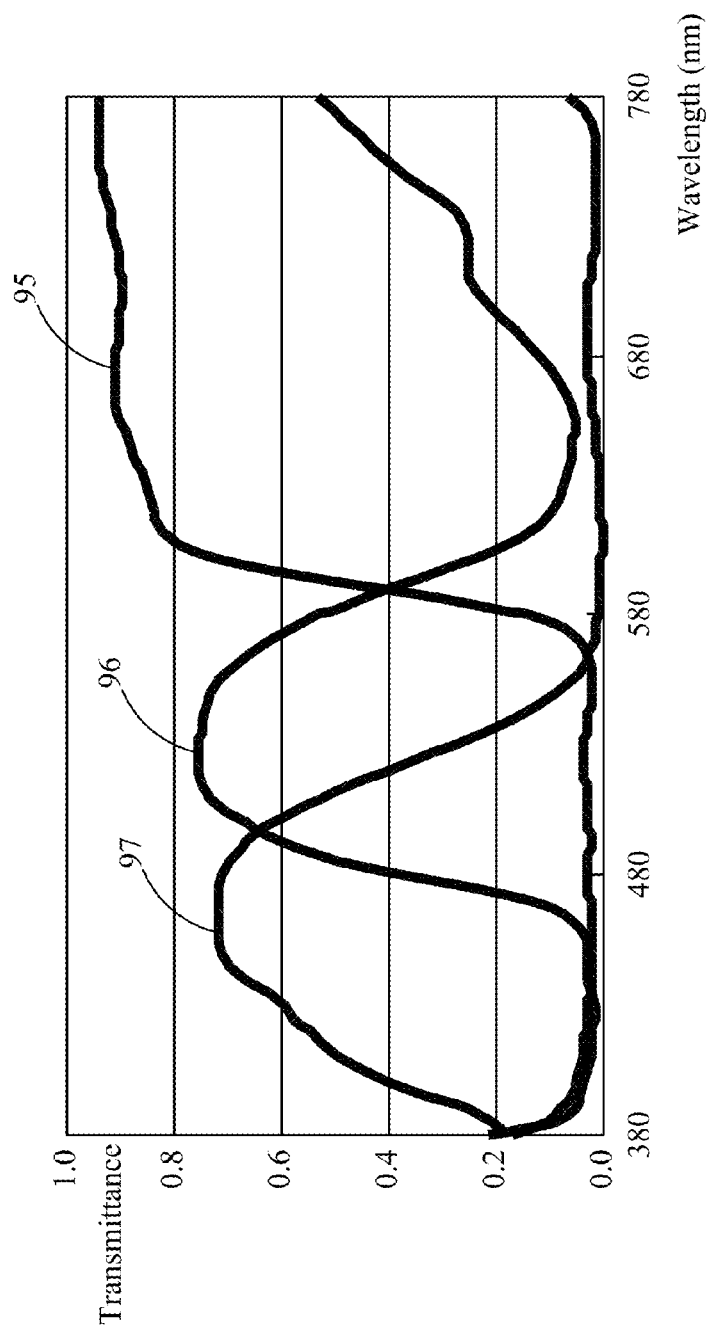
FIG. 4 is a graph showing the relationship between laser beam wavelength and transmittance.

Please refer to FIG. 4, which is a graph showing the relationship between laser beam wavelength and transmittance. In FIG. 4, the curve 95 represents the transmittance variation of a red-photoresist coating with respect to the projection of laser beams of different wavelengths; the curve 96 represents the transmittance variation of a green-photoresist coating with respect to the projection of laser beams of different wavelengths; and the curve 97 represents the transmittance variation of a blue-photoresist coating with respect to the projection of laser beams of different wavelengths. In this embodiment, the wavelength of the femtosecond laser beam is ranged between 532 nm and 1064 nm, the frequency of the femtosecond laser beam is ranged between 100 KHz and 2 MHz, and the pulse width of the femtosecond laser beam is not larger than 500 femtosecond (fs). Moreover, the laser dose of the photoresist layer at positions corresponding to the at least one hot pixel resulting from the projection of the femtosecond laser beam is ranged between 1 mJ/cm$^2$ and 61 mJ/cm$^2$. In addition, for enhancing the focusing of the femtosecond laser, there is at least one focus lens unit being disposed on the optical path of the femtosecond laser beam as it is projected toward the filter, whereas each focus lens unit is composed of at least one lens.

Please refer to FIG. 5, which is a schematic diagram showing a system for repairing flat panel display according to the present disclosure. As shown in FIG. 5, the system for repairing flat panel display 4 comprises: a mobile platform 40 and a femtosecond laser source 41, in which the mobile platform 40 is composed of a carrier 400 and a driving unit 401 capable of driving the carrier 400 to perform a three-dimensional linear movement. In this embodiment, the driving unit 401 can be an assembly of screw rods and motors, or can be an assembly of linear motors, but is not limited thereby. It is noted that, in a XYZ-axes Cartesian coordinate system, the driving unit 401 is designed to drive the carrier 400 to move and displace in the X-axis direction and the Y-axis direction, and thereby, adjust the position of the carrier 400 on a horizontal surface. Moreover, the driving unit 401 is also capable of driving the carrier 400 to move and displace in the Z-axis direction for adjust the distance between the femtosecond laser source 41 and the carrier 400, and thus, adjusting the focal length of the femtosecond laser beam 90. In FIG. 5, a flat panel display 3 is placed on the mobile platform 40, which is a display having hot pixels that is constructed the same as the one shown in FIG. 2, but is not limited thereby. The mobile platform 40 is further coupled to a control unit 42, which can be a computer or an assembly of a chip with calculation ability and memories. Operationally, by inputting the positions of the hot pixels into the control unit 42 through the input interface of the same, the positions of the hot pixels can be registered into the control unit 42 while enabling the same to generate a control signal for directing the mobile platform 40 to move accordingly so as to enable the femtosecond laser beam 90 to project and focus on the photoresist layer 311 at positions corresponding to the hot pixels. In this embodiment, the control signal generated from the control unit 42 is sent to the driving unit 401 for enabling the same to drive the carrier 400 to move accordingly.

The femtosecond laser source 41, being provided for emitting a femtosecond laser beam, can be disposed at a side of the mobile platform 40, but in this embodiment, the femtosecond laser source 41 is disposed above the mobile platform 40. Moreover, in this embodiment, the femtosecond laser source 41 is further coupled to an adjustment unit 43, which is composed of a frequency/energy adjuster and a wavelength adjuster so as to be used for adjusting the wavelength, the pulse frequency, laser dose and pulse width of the femtosecond laser beam. In this embodiment, the wavelength of the femtosecond laser beam is ranged between 532 nm and 1064 nm, the frequency of the femtosecond laser beam is ranged between 100 KHz and 2 MHz, and the pulse width of the femtosecond laser beam is not larger than 500 femtosecond (fs). In addition, for enhancing the focusing of the femtosecond laser beam 90, there is a focus lens unit 44 being disposed on the optical path of the femtosecond laser beam 90 as it is projected toward the flat panel display 3, whereas the focus lens unit 44 is composed of at least one lens. It is noted that the configuration of the focus lens unit 44 is known to those skilled in the art, and thus is not limited by the embodiment shown in FIG. 5. Moreover, there can be a reflective mirror 45 being disposed on the optical path of the femtosecond laser beam 90 that is used for guiding the femtosecond laser beam 90 toward the flat panel display 3.

The flat panel display repairing system 4 is designed for repairing the flat panel display 3 following the repairing steps disclosed in FIG. 1. That is, the positions of the hot pixels on the flat panel display 3, or defective positions required to be repaired are first being inputted into the control unit 42 for registration, and then the control unit 42 will generate control signals according to the registered positions for directing the driving unit 401 to drive the carrier 400 to move accordingly, and thereby, the hot pixels are move and displace until they are located corresponding to the projection of the femtosecond laser beam 90, and thus the femtosecond laser beam 90 is projected and focused on the photoresist layer 311 inside the filter 31 of the flat panel display 3 at positions corresponding to the hot pixels, for blackening the photoresist layer 311 at positions corresponding to the hot pixels due to nonlinear multiple photons absorption, and thus transforming the blackened areas of the photoresist layer 311 into the blackened photoresist layer 311a, as shown in FIG. 6. After the photoresist layer 311 at positions corresponding to the hot pixels are blackened, the hot pixels will be transformed into dark pixels since the light of the constant-on hot pixels will be blocked by the blackened photoresist layer 311a for preventing the same from traveling passing the filter.

Figure 7A:
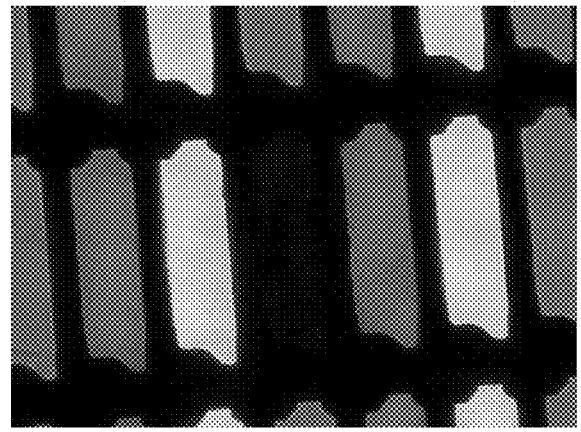
FIG. 7A is an image of a red-photoresist coating in the filter after being repaired by the present disclosure.
Figure 7B:
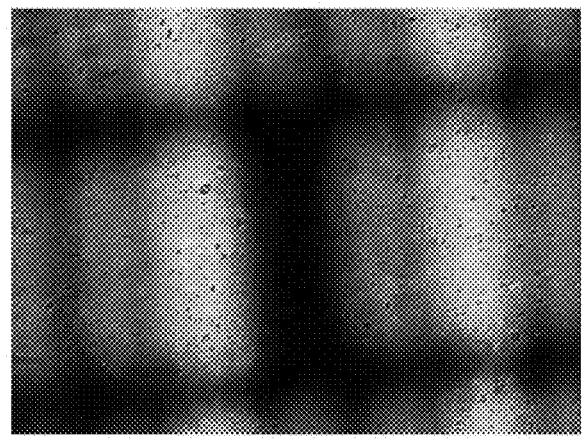
FIG. 7B is an image showing that the polarizer corresponding to the red-photoresist coating is not damaged after laser projection for repairing in the present disclosure.

Although a femtosecond laser projection is used in the present disclosure for repairing hot pixels due to nonlinear multiple photons absorption, and as shown in FIG. 2, although the femtosecond laser beam 90 is projected passing through the polarizer 304 before being focused on the photoresist layer 311 at positions corresponding to the hot pixels during the whole repairing process, the energy density projected on the polarizer 304 is lower than its modification threshold due to nonlinear multi-photon effect, and thus the femtosecond laser beam 90 will not cause ant damage to the polarizer 304 or other areas or components on the optical path of the femtosecond laser beam 90. As shown in FIG. 7A, the red-photoresist coating in the filter had already been blackened. As shown in FIG. 7B, the polarizer corresponding to the red-photoresist coating is not damaged after laser projection for repairing in the present disclosure.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for repairing flat panel display, comprising the steps of:
   providing a flat panel display having at least one hot pixel and being configured with a liquid crystal module and a filter in a manner that the filter is formed with a photoresist layer while being disposed on the liquid crystal module; and
   projecting a femtosecond laser beam on the photoresist layer at positions corresponding to the at least one hot pixel for blackening the corresponding hot pixels due to nonlinear multiple photon absorption;
   wherein the wavelength of the femtosecond laser beam is ranged between 532 nm and 1064 nm;
   wherein the laser dose of the photoresist layer at positions corresponding to the at least one hot pixel resulting from the projection of the femtosecond laser beam is ranged between 1 mJ/cm$^2$ and 61 mJ/cm$^2$; and
   wherein the pulse width of the femtosecond laser beam is not larger than 500 femtosecond (fs).

2. The method of claim 1, wherein the frequency of the femtosecond laser beam is ranged between 100 KHz and 2 MHz.

3. The method of claim 1, further comprising the step of:
   enabling the femtosecond laser beam to be projected passing through at least one focus lens before being projected upon the photoresist layer at positions corresponding to the at least one hot pixel.

4. The method of claim 1, further comprising the step of:
   attaching a polarizer to the photoresist layer on a surface thereof that is provided for receiving the femtosecond laser beam.

5. The method of claim 1, wherein the filter is a color filter and the photoresist layer is a color photoresist layer.

6. The method of claim 1, further comprising the step of:
   arranging at least one focus lens unit on the optical path of the femtosecond laser beam for improving the focusing of the femtosecond laser beam.

7. The method of claim 1, further comprising the step of:
   attaching a polarizer to the filter on a surface thereof that is provided for receiving the femtosecond laser beam.

8. A system for repairing flat panel display, comprising:
   a mobile platform;
   a flat panel display, having at least one hot pixel formed thereat while being disposed on the mobile platform, and being configured with a liquid crystal module and a filter having a photoresist layer formed thereon; and
   a femtosecond laser source, for providing and projecting a femtosecond laser beam on the photoresist layer at positions corresponding to the at least one hot pixel for blackening the corresponding hot pixels due to nonlinear multiple photon absorption;
   wherein the wavelength of the femtosecond laser beam is ranged between 532 nm and 1064 nm;
   wherein the laser dose of the photoresist layer at positions corresponding to the at least one hot pixel resulting from the projection of the femtosecond laser beam is ranged between 1 mJ/cm$^2$ and 61 mJ/cm$^2$; and
   wherein the pulse width of the femtosecond laser beam is not larger than 500 fs.

9. The system of claim 8, wherein the femtosecond laser source further comprises:
   an adjustment unit, for adjusting the wavelength, the pulse frequency, laser dose and pulse width of the femtosecond laser beam.

10. The system of claim 9, wherein the frequency of the femtosecond laser beam is ranged between 100 KHz and 2 MHz.

11. The system of claim 8, further comprising:
    at least one focus lens unit, disposed on the optical path of the femtosecond laser beam for improving the focusing of the femtosecond laser beam.

12. The system of claim 8, further comprising:
    a polarizer, attaching to the filter on a surface thereof that is provided for receiving the femtosecond laser beam.

13. The system of claim 8, the mobile platform further comprises:
    a carrier; and
    a driving unit, for driving the carrier to perform a three-dimensional linear movement.

14. The system of claim 8, further comprising:
    a control unit, for registering the position of the at least one hot pixel and thus generating a control signal for directing the mobile platform to move accordingly so as to enable the femtosecond laser beam to project and focus on the photoresist layer at positions corresponding to the at least one hot pixel.

15. The system of claim 8, wherein the filter is a color filter and the photoresist layer is a color photoresist layer.

* * * * *